United States Patent [19]  [11] Patent Number: 5,428,771
Daniels et al.  [45] Date of Patent: Jun. 27, 1995

[54] TRANSPARENT TRANSACTION COORDINATION BETWEEN DISTRIBUTED NETWORKS HAVING DIFFERENT COMMUNICATION PROTOCOLS

[75] Inventors: Dean S. Daniels, Fremont, Calif.; Thomas J. Freund, Austin, Tex.; Roger L. Haskin, San Jose, Calif.; Robert A. Storey, South Thampton, England

[73] Assignee: International Business Machines Corporation, Armonk, N.Y.

[21] Appl. No.: 245,845

[22] Filed: May 19, 1994

Related U.S. Application Data

[63] Continuation of Ser. No. 761,541, Sep. 18, 1991, abandoned.

[51] Int. Cl.$^6$ .............................................. G06F 15/40
[52] U.S. Cl. .................................. 395/575; 395/200; 395/600; 395/650; 370/85.13; 364/DIG. 1; 364/282.1; 364/282.4; 364/284
[58] Field of Search ................ 395/575, 800, 375, 600, 395/650, 500, 200; 370/85.13, 85.14, 85.17, 85.15, 85.16

[56] References Cited

U.S. PATENT DOCUMENTS

| | | | |
|---|---|---|---|
| 4,507,751 | 3/1985 | Gawlick et al. | 395/575 |
| 4,648,061 | 3/1987 | Foster | 264/900 |
| 4,677,611 | 6/1987 | Yanosy, Jr. et al. | 370/85 |
| 4,688,170 | 8/1987 | Waite et al. | 364/200 |
| 4,760,395 | 7/1988 | Katzeff et al. | 340/825.03 |
| 4,787,028 | 11/1988 | Finfrock et al. | 364/200 |
| 4,819,159 | 4/1989 | Shipley et al. | 395/575 |
| 4,893,307 | 1/1990 | McKay et al. | 370/94.1 |
| 5,095,421 | 3/1992 | Freund | 395/650 |
| 5,140,689 | 8/1992 | Kobayashi | 395/575 |
| 5,142,622 | 8/1992 | Owens | 395/200 |
| 5,258,982 | 11/1993 | Britton et al. | 370/110.1 |
| 5,261,089 | 11/1993 | Coleman et al. | 395/650 |
| 5,329,626 | 7/1994 | Klein et al. | 395/375 |
| 5,333,314 | 7/1994 | Masai et al. | 395/575 |

OTHER PUBLICATIONS

"A Bridge to SNA", V. Forgetta, T. Clark, Computerworld Focus.
"Bringing UNIX Machines within an IBM Network," M. Mendelsohn, Data Communictions, Aug. 1985, pp. 111–115.

*Primary Examiner*—Alyssa H. Bowler
*Assistant Examiner*—Mehmet Geckil
*Attorney, Agent, or Firm*—Mark E. McBurney; Paul S. Drake

[57] ABSTRACT

A mechanism is provided which allows transparent transaction processing to occur between distributed networks using the AIX or SNA protocols. The present invention will convert between the AIX standard of Two Phase Commit/Presumed Abort (2PC/PA) and the SNA standard of Two Phase Commit/Presume Nothing (2PC/PN). The Presumed Abort Protocol will optimize operations by reducing the number of messages between sites participating in the transaction, and the amount of transaction state information maintained at a site. Thus, any messages needed will be generated and transaction status information will be maintained in order to satisfy a Standard 2PC/PN protocol, when sites within a SNA network are participating in an AIX transaction. Further, the present invention will discard, or ignore any extraneous messages which are received while sites within an AIX network are participating in a SNA transaction.

20 Claims, 9 Drawing Sheets

TRANSPARENT TRANSACTION COORDINATION BETWEEN DISTRIBUTED NETWORKS HAVING DIFFERENT COMMUNICATION PROTOCOLS

This is a continuation of application Ser. No. 07/761,541 filed Sep. 18, 1991, now abandoned.

BACKGROUND OF THE INVENTION

1. Field of the Invention

This invention is generally related to providing a mechanism for converting the transaction processing protocols between a distributed network using a UNIX system (UNIX is a registered trademark of AT&T), such as the AIX operating system (AIX is a trademark of IBM Corp.), and a distributed system using a Systems Network Architecture (SNA) environment. These networks may include a plurality of interconnected computer workstations, such as the RISC/System 6000, manufactured by IBM Corp. (RISC/System 6000 is a trademark of IBM Corp.), or other similar data processing systems.

2. Description of Related Art

Co-pending U.S. patent application "Transaction Processing Facility within an Operating System Environment," assigned to the assignee of the present invention filed Aug. 17, 1989, Ser. No. 07/395,249, which relates to transaction processing system enhancements to an operating system, is hereby incorporated by reference.

Co-pending U.S. patent application "Communication Interface in a Transaction Processing Environment," assigned to the assignee of the present invention, filed Jun. 29, 1990, Ser. No. 07/546,495, relating to communication services within a transaction processing environment is hereby incorporated by reference.

Conventional transaction processing systems provide a user with distributed processing in a homogenous environment, i.e. transaction processing occurs only within the AIX environment, or the SNA environment. Current standards do not address the issues of interconnectabilty of systems having different transaction processing protocols, or the situation where different transaction protocols may exist within a specific distributed transaction processing environment.

The AIX distributed transaction processing system conforms to the X/Open Portability Guide proposal that specifies implementation of a Two Phase Commit/Presumed Abort (2PC/PA) Protocol. Alternately, the IBM SNA Syncpoint facility is an IBM standard for a distributed transaction processing environment that specifies implementation of a Two Phase Commit/Presume Nothing (2PC/PN) Protocol. Additionally, the protocols differ in the mechanism for identifying the operations that mark the actions which are to be treated as a group, and the mechanism for recovering from failure within the distributed environment.

Therefore, it can be seen that a protocol conversion problem exists when the two networks are interconnected in a transaction processing environment, i.e. the coordination of a transaction across resources in both the AIX network and the SNA network. Traditional solutions to this problem include: (1) restricting transactional operations to a homogenous transaction environment, i.e limiting transaction processing to either the AIX or SNA network; (2) defining a standard, such as the International Standards Organization Transaction Processing Facility (ISO/TP) and map the transaction processing within the non-compatible networks to that standard, i.e. map SNA and AIX to ISO/TP; and (3) providing only limited shared access between the two non-compatible networks, i.e. provide a communications converter between AIX and SNA, but no Two Phase Commit.

In view of the problems associated with prior art protocol conversion techniques, it would be desirable to have a mechanism which would provide the users of either the AIX, or SNA system with a transparent connection to the other distributed transaction processing environment. Further, a mechanism which provides for transforming the necessary protocol and data between AIX and SNA transactional environments, without the necessity of modifying the actual AIX or SNA facility would be advantageous.

SUMMARY OF THE INVENTION

In contrast to the prior art, the present invention provides a mechanism which allows transparent transaction processing to occur between distributed networks using the AIX or SNA protocols. The present invention is essentially a bridge which will convert protocols received from one distributed environment into protocols which can be handled by the other distributed environment.

The present invention will convert between the AIX standard of Presumed Abort (2PC/PA) and SNA standard of Presume Nothing (2PC/PN). Broadly, the Presumed Abort Protocol will optimize operations by reducing the number of messages between sites participating in the transaction, and the amount of transaction state information maintained at a site. Thus, the present invention will generate any messages needed and maintain transaction status information in order to satisfy a Standard Two Phase Commit/Presume Nothing protocol, when sites within a SNA network are participating in an AIX transaction. Further, the present invention will discard, or ignore (filter) any extraneous messages which are received while sites within an AIX network are participating in a SNA transaction.

The AIX and SNA transaction processing systems use unique identifiers to distinguish transaction operations. For example a logical unit of work identifier (LU-WID) is used by a SNA transaction processing system. The rules by which the identifiers are generated and maintained differ between the protocols.

Additionally, the rules by which application programs delineate transactions differ between protocols. The presume abort 2PC used by AIX only allows the application that started the transaction to issue a COMMIT_TRANSACTION message. However, under the presume nothing SNA 2PC a COMMIT_TRANSACTION can be initiated from anywhere in the distributed transaction processing system. Therefore, the present invention provides for a facility in the AIX network to allow migration of the transaction coordination responsibility in response to a commitment request from SNA.

Further, the present invention provides conversion for the recovery function which is implemented when transaction resources become isolated from one another. SNA optimizes to minimize the message flows, thus resynchronization between the participating transaction sites occurs by specialized flows to exchange logs and by comparing transaction states across the sites, whereas AIX merely re-drives existing 2PC logic.

In accordance with the previous summary, objects, features and advantages of the present invention will

DETAILED DESCRIPTION OF THE PREFERRED EMBODIMENTS

Figure 1:
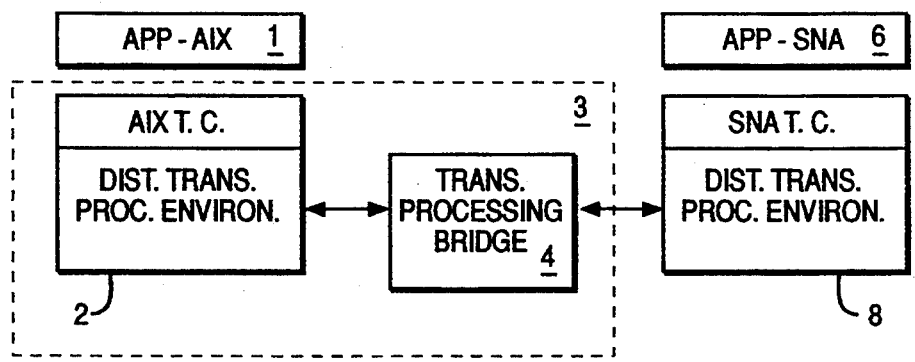
FIG. 1 is a block diagram showing the link between the AIX and SNA distributed networks, and the bridge which provides for transparent transaction processing.

Referring to FIG. 1, a block diagram is shown which illustrates the structure of the present invention. An AIX operating system program application 1 is shown which runs on an AIX distributed network 3, which includes a transaction processing facility 2. Similarly, a SNA program application 6 runs in conjunction with a SNA distributed processing environment 8. These two distributed networks are connected via a transaction processing bridge 4 which functions to convert the respective transaction processing protocols of each system into protocols which can be utilized by the other system. The Two Phase Commit/Presumed Abort protocol of AIX and the Two Phase Commit/Presume Nothing protocol of SNA differ in that the Two Phase Commit/Presumed Abort presumes that in the absence of any information regarding a transaction's outcome the transaction is aborted. Whereas the SNA protocol presumes nothing regarding transaction outcome and maintains a list of transaction participants wherein transaction managers are required to exchange information among or between sites to determine the transaction outcome. Bridge 4 is a part of the AIX environment and provides transparency between users of the AIX and SNA transaction processing systems. In some instances, the transaction processing bridge 4 will generate messages needed by one of the distributed transaction processing environments. Also the bridge 4 may serve as a buffer, or filter to delete messages generated by one of the transaction processing environments which are not required by the other. Further, bridge 4 transfers, or ignores transaction state information between the AIX and SNA distributed systems. Whether the bridge transfers the state information, or ignores it depends upon the direction of the flow of information between the two systems. Thus, in this manner it can be seen how transaction processing bridge 4 provides for transparency between users of applications running on either the AIX distributed network or SNA distributed network.

Figure 8:
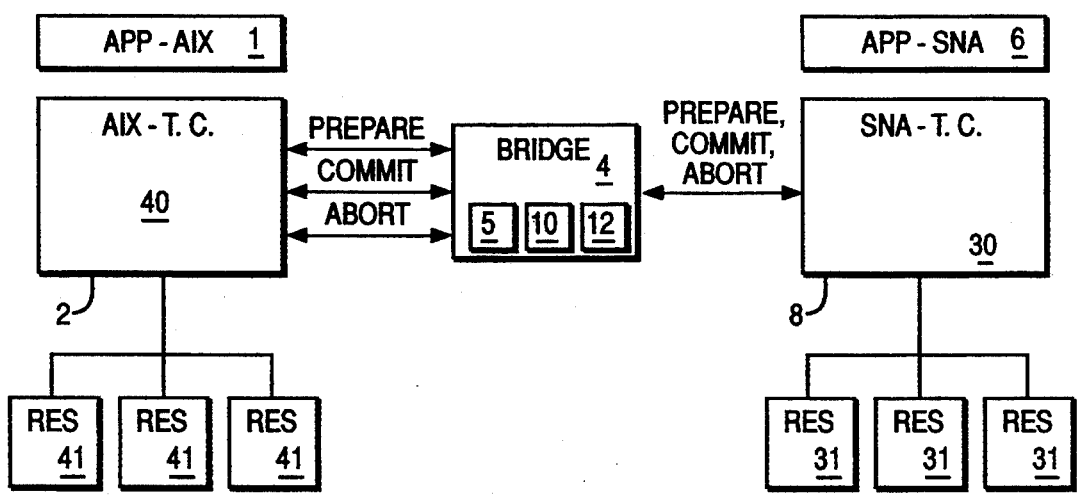
FIG. 8 is a block diagram showing the flow of transaction data between the AIX network, bridge and SNA network.

FIG. 8 also shows the transaction processing structure wherein a transaction, implemented by one of the applications 1,6 is processed across both the AIX and SNA networks such that resources 31 and 41, e.g. files, database programs and the like, can be utilized. The AIX transaction coordinator 40 and associated resources 41 are capable of being used in conjunction with the SNA resources 31. Similarly, the SNA transaction coordinator 30 is capable of utilizing the SNA resources 31 and the AIX resources 41. This utilization of the other network's resources is transparent to the applications 1,6 and the transaction being processed.

Figure 2:
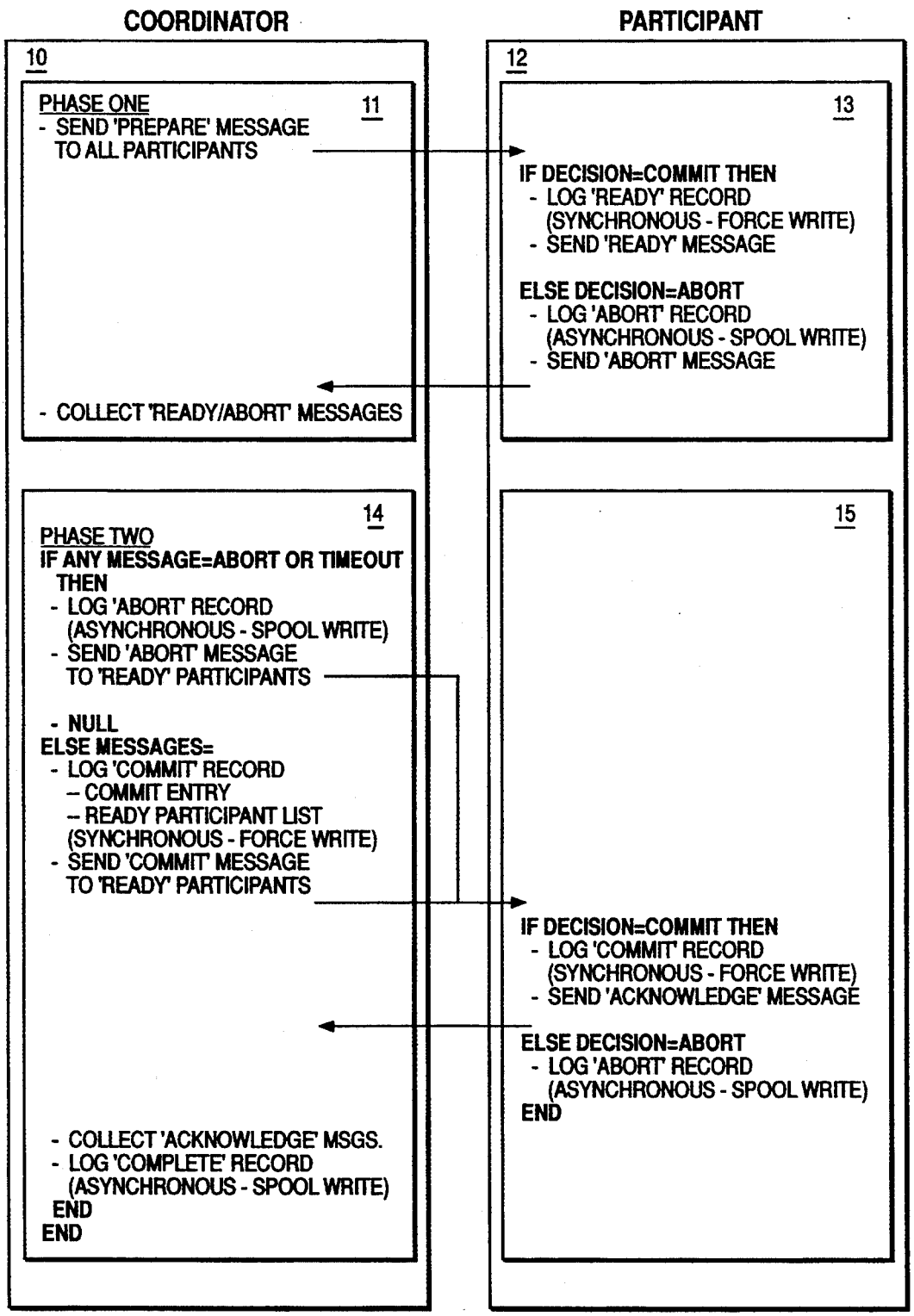
FIG. 2 is a diagram showing transaction processing protocols within an AIX network.
Figure 3:
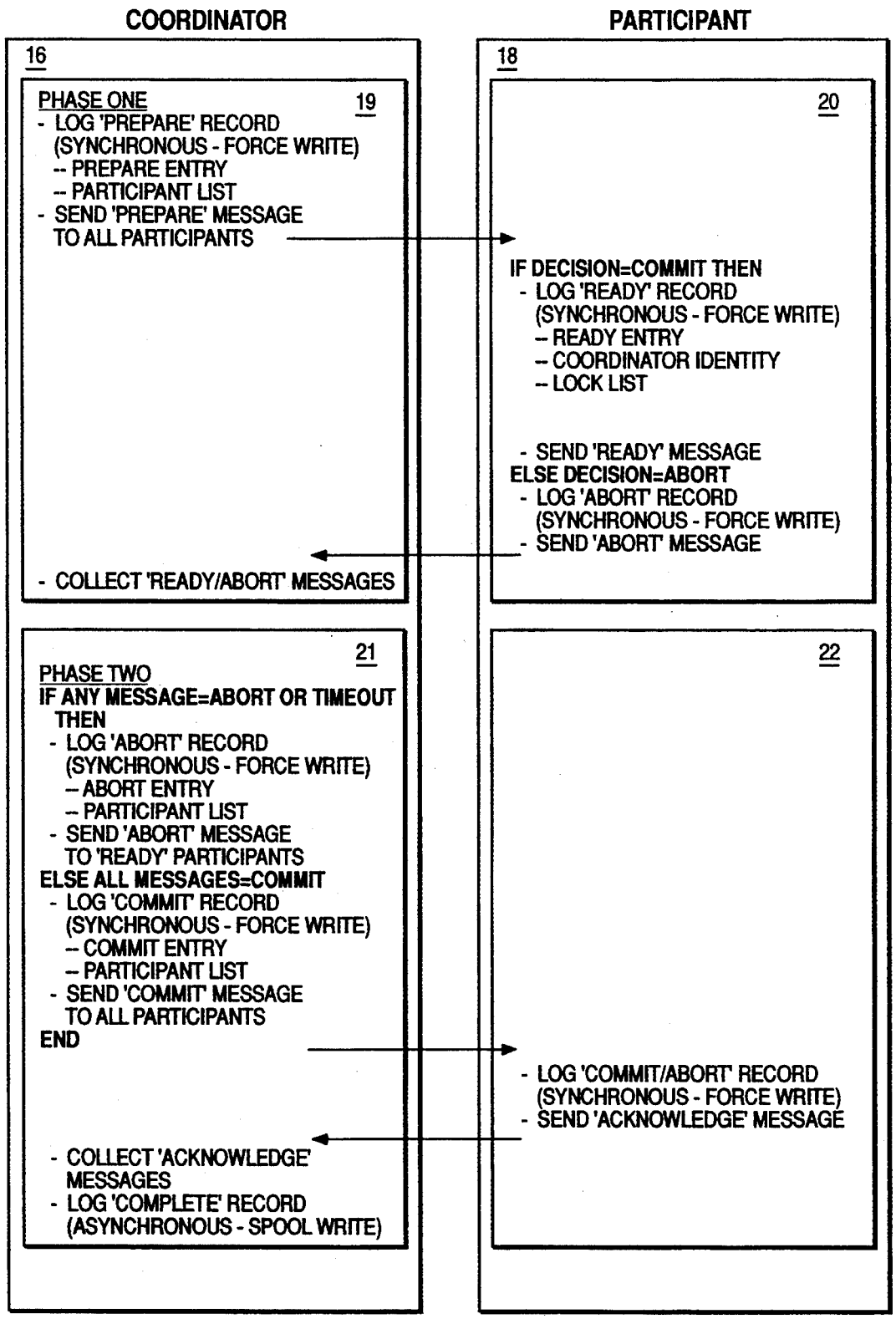
FIG. 3 shows transaction processing protocols within a SNA network.

FIGS. 2 and 3 will show how the AIX and SNA transaction processing protocols, which are a set of rules and commands that define the respective protocols, are bidirectionally converted from one to the other. FIG. 2 is a chart illustrating the message flow between an AIX transaction coordinator 10 and an AIX participant 12. As previously noted, an AIX system utilizes a Two Phase Commit Presumed Abort transaction processing protocol. Block 11 represents phase one of the coordinator Two Phase Commit/Presumed Abort protocol. PREPARE messages are sent by the coordinator 10 to all participants 12. The participants then determine if the operation of the transaction can be guaranteed. If so, and the decision is COMMIT, then the participants log READY (ready entry, coordinator identity and pertinent data, e.g. lock list) and send a READY message back to the coordinator 10. Otherwise the participants 12, at block 13 (phase one of participants Two Phase Commit/Presumed Abort protocol) have determined that the transaction is to be aborted. ABORT is logged in the record and the ABORT message is sent to the transaction coordinator 10 which collects READY/ABORT messages at the end of the first phase of the Two Phase Commit/Presumed Abort protocol. Next, the transaction coordinator 10 determines during phase two (block 14) if an ABORT or TIMEOUT message has been received. TIMEOUT occurs where no action has been taken during a particular time interval and is treated the same as ABORT. If ABORT or TIMEOUT occurs, ABORT is recorded and sent to all participants 12 which have previously indicated ready. If all sites respond READY, i.e. all sites guarantee that the operations performed can be made permanent, then COMMIT is logged with a COMMIT entry and a READY participant list is generated. Subsequently, the COMMIT message is sent to all READY participants. The involvement of participant 12 at block 15 (phase two of participants Two Phase Commit/Presumed Abort protocol) includes receiving the ABORT or COMMIT message, sent by transaction coordinator 10, and if the decision is to COMMIT, then COMMIT transaction is logged and an acknowledge message is sent to the transaction coordinator 10. Otherwise ABORT is logged in the record and the process for the participant 12 ends. Finally, coordinator 10 collects all acknowledge messages from participants 12, logs COMPLETE in the record and ends the transaction.

FIG. 3 shows the transaction processing protocols used by the SNA system which is a 2PC/PN protocol. Reference numeral 16 represents the SNA transaction coordinator which initiates phase one of the Two Phase Commit protocol (block 19) by implementing a log PREPARE record operation which includes preparing a PREPARE entry and participant list. The PREPARE message is then sent to all SNA participants 18. Participants 18 then determine at block 20 whether the decision is to COMMIT and if so this decision is logged as READY (ready entry, coordinator identity and lock list). This action by participant 18 at block 20 is similar to the action taken by an AIX participant when a PREPARE message is received (block 13, FIG. 2). The READY message is then sent to the transaction coordinator 16. Otherwise the decision is considered to be ABORT and ABORT is logged with the ABORT message being sent to the SNA transaction coordinator 16. READY or ABORT messages are then collected by the coordinator 16 and the operations within block 19 end.

At phase two of the 2PC/PN protocol, shown within block 21, the transaction coordinator 16 determines if any messages indicate the transaction is to be aborted or a timeout has occurred. If so, the ABORT record is logged. That is, an ABORT entry is entered and the participant list is updated. The ABORT message is sent to all of the transaction participants 18 that have indicated a READY state. Otherwise, all messages are considered to be COMMIT in which case the log is updated to reflect the COMMIT message by entering a COMMIT identifier and updating the participant list. The COMMIT message is then sent to all participants. Block 22 shows the responsibility of participant 18 in the presume nothing transaction processing protocol. Participant 18 receives and logs COMMIT or ABORT in the record and returns an ACKNOWLEDGE message to coordinator 16 which then collects all acknowledge messages from participants and COMPLETE is logged in the record.

Figure 4A:
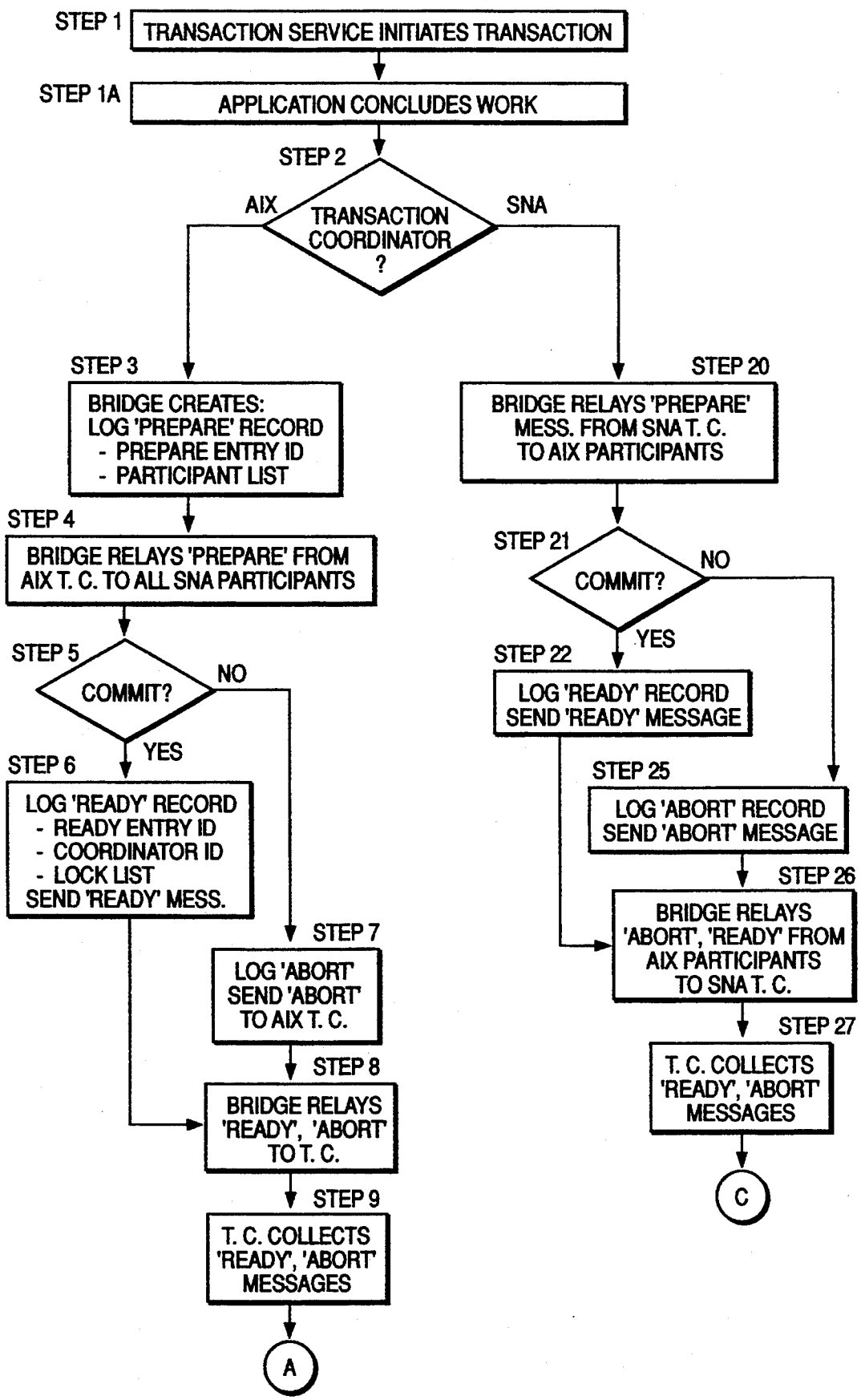
FIG. 4A-4C are flowcharts illustrating the steps which must be implemented by the bridge of the present invention in order to allow for transparent transaction processing.
Figure 4B:
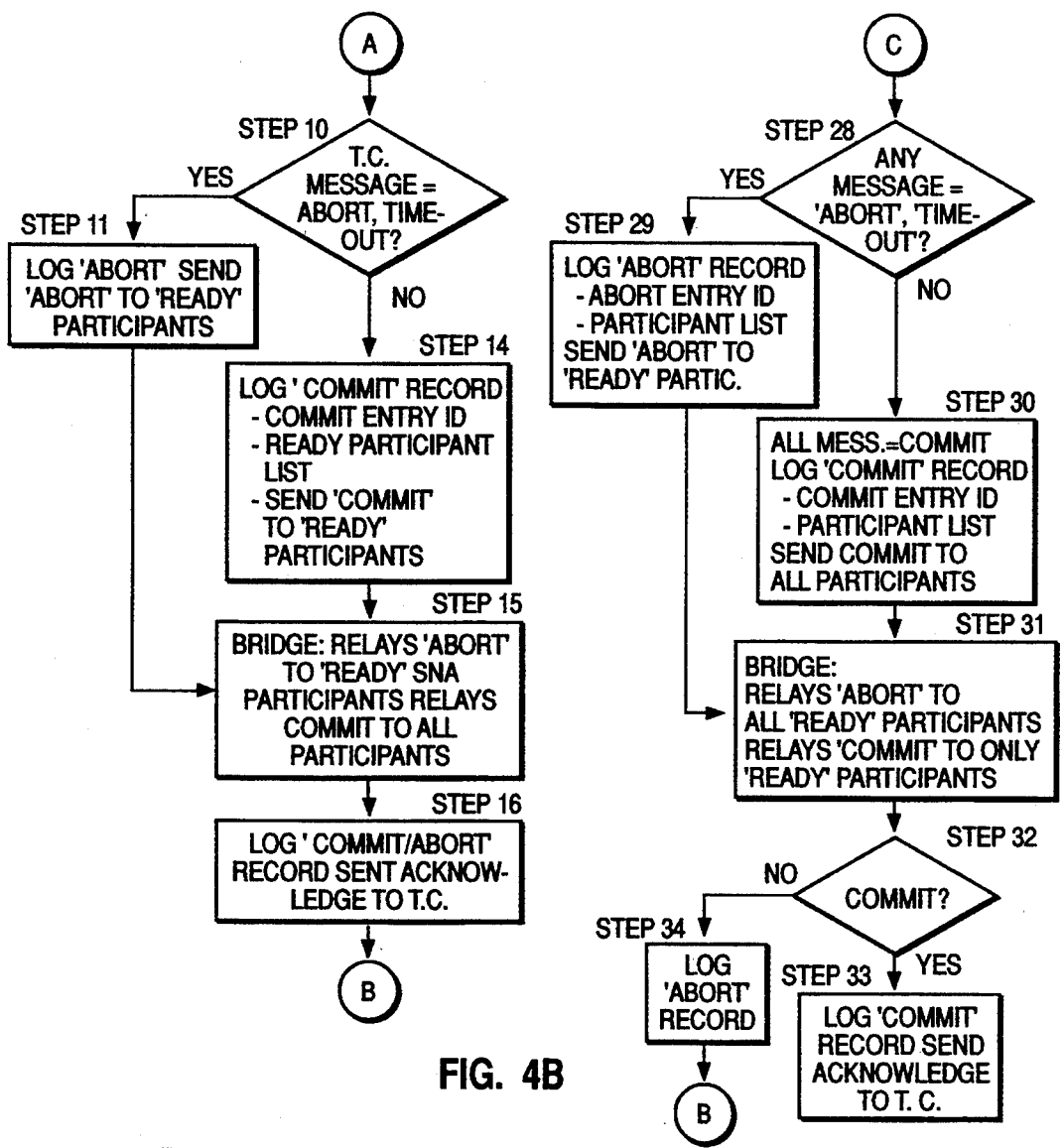
Figure 4C:
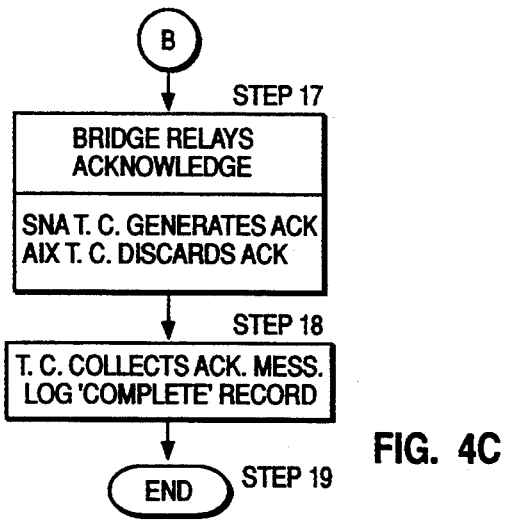

It can be seen that several differences exist between the protocols used for AIX 2PC/PA distributed processing and SNA 2PC/PN distributed transaction processing. For example in a 2PC/PA protocol, no information is logged until decision points within the transaction are reached (e.g. READY/COMMIT/ABORT), and for all other steps no recovery information is maintained or required to recover the transaction from failure. In contrast, 2PC/PN protocol logs each step and replays the log after failure. The 2PC/PN coordinator and participants communicate with each other for all outcomes of a transaction (ABORT/COMMIT). The present invention allows for interconnection of the two types of systems by generating and/or deleting messages which are not required from one or the other systems. A bidirectional conversion of messages occurs between the AIX and SNA networks and will include converting transaction processing information which encompasses transaction state (status) information, as well as transaction identifier information from one network to the other. FIGS. 4A-4C show the steps and procedures which must be utilized by the bridge 4 in order to provide protocol transparency between AIX and SNA distributed systems, by bidirectionally converting transaction processing state information for each protocol into transaction processing state information associated with the other protocol. That is, AIX transaction processing state information is converted into SNA transaction processing state information and SNA TP state information is converted into AIX TP state information.

At step 1 an application operating in conjunction with either the SNA or AIX distributed network performs a group of operations as a transaction and the transaction service initiates the transaction protocol. At step 1a the application concludes its work, and at step 2 the 2PC protocol determines whether the transaction coordinator is designated within the AIX distributed system or the SNA distributed system. Assuming that the transaction coordinator is designated within the AIX distributed system, bridge 4 then assembles the coordinator information associated with a 2PC/PN protocol which includes creation of a log of a PREPARE record, i.e. PREPARE entry identification and a list of participants to be included in the transaction. It can be seen from FIG. 2 (block 11) that the AIX transaction service does not maintain such a log, however this information is required by SNA. Therefore, bridge 4 must generate this log in order for the SNA participants to have access to information needed during transaction processing and recovery. At step 4, the bridge relays the PREPARE message from the AIX transaction coordinator to all SNA participants. Steps 5-7 show the COMMIT protocol used during phase 1 by the SNA participants. Bridge 4 then relays the READY or ABORT messages from the SNA participants to the AIX transaction coordinator (step 8), which collects all READY or ABORT messages at step 9. Steps 10, 11 and 14 illustrate processing which occurs at the AIX transaction coordinator during phase two of the transaction processing. At step 15, bridge 4 relays any ABORT messages from the AIX transaction coordinator to all ready SNA participants. Further, at step 15, bridge 4 sends any COMMIT message to all SNA participants. At step 16 the COMMIT message is logged by the SNA participant and an acknowledgment is sent to the transaction coordinator. Bridge 4 relays this acknowledgement to the AIX transaction coordinator at step 17. At step 18, the transaction coordinator collects ACKNOWLEDGE messages from all participants, discards any received ABORT responses and logs COMPLETE in the record, and the process ends at step 19.

If at step 2, it was determined that the designated transaction coordinator is in the SNA distributed processing system, bridge 4 relays the PREPARE message from the transaction coordinator to all participants (step 20). Steps 21, 22 and 25 indicate the 2PC/PA protocol utilized within the AIX participant during transaction processing (block 13, FIG. 2). At step 26 the bridge 4 relays any ABORT and READY messages from AIX participants. At step 27 the transaction coordinator collects all READY and ABORT messages and steps 28-30 indicate transaction processing operations contained in phase two of the 2PC/PN protocol (see block 21, FIG. 3). At step 31 bridge 4 relays any ABORT message from the SNA transaction coordinator to all participants that have indicated a READY state. Bridge 4 at step 31 also relays the COMMIT message to those participants which have indicated a READY state. Steps 32-34 show processing which is implemented by an AIX participant during the second phase of the 2PC/PA protocol (block 15, FIG. 2). Subsequent to step 34 the present invention proceeds to step 17 where the bridge 4 relays an ACKNOWLEDGE message to the transaction coordinator and generates an ABORT message, if appropriate, for communication to the transaction coordinator. At step 18 the SNA transaction coordinator collects all acknowledge messages and logs complete. Step 19 ends the transaction.

Figure 5:
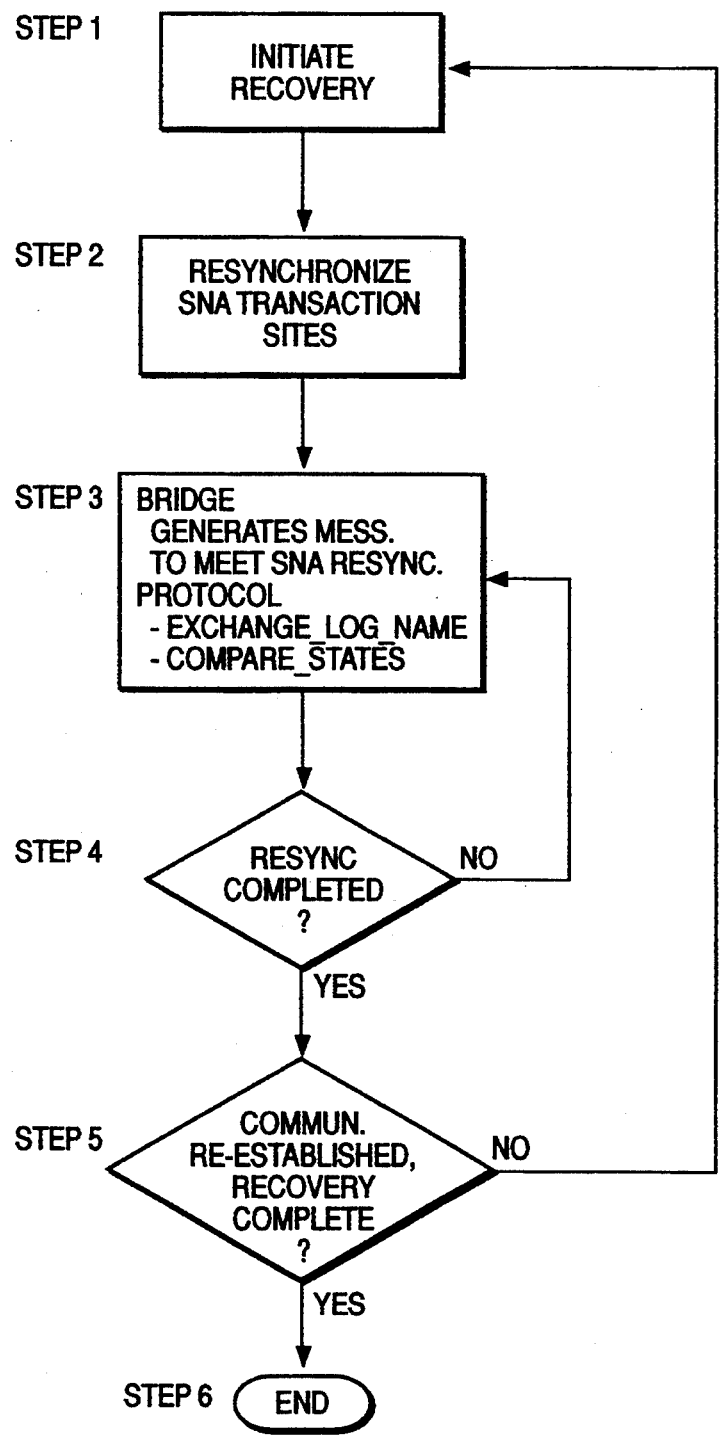
FIG. 5 is a flowchart showing the recovery aspect of the present invention.

FIG. 5 shows steps required to be implemented by bridge 4 during a recovery process wherein transaction coordinators have become isolated from transaction participants such as when communications failures, or the like exist. This recovery process includes exchanging status information between the AIX and SNA networks to ensure that the transaction being processed can be reconstructed after failure. To recover the transaction, state information and transaction identifier information (discussed below) for the transaction must be compared and exchanged by bridge 4.

At step 1 the transaction service determines that recovery must be initiated. Bridge 4, at step 2, then begins resynchronization of any participating SNA transaction sites, and generates any messages required to meet the SNA resynchronization protocol. Comparing state information between the transaction coordinator and participating resources allows the exchange of information to be synchronized. These messages may include commands which will ensure the sites all have confirmed they are utilizing consistent transaction information, i.e. same site state table (EXCHANGE_LOG_NAME) and actually exchange transaction information (COMPARE_STATES). By an exchange of information, the transaction state is reconstructed to that state prior to failure. In this manner the transaction is recovered by examining a transaction information state table, maintained by the SNA transaction coordinator, for appropriate responses. The present invention then implements all high-level flows of transaction state information between the bridge 4 and SNA network. Whereas, the state information flows between bridge 4 and the AIX network transaction service are discrete communications, the state information flowing between the SNA transaction network and bridge 4 is bundled together as one communication (high-level flow). FIG. 8 illustrates this information flow and shows a recovery look up table 5 which is provided in bridge 4, that allows the bundled SNA 2PC/PN communication to be separated into the discrete state information recognizable by an AIX transaction service, i.e. ABORT, COMMIT, PREPARE. Of course, when information flows from the AIX transaction service to the SNA network, the discrete state information must be bundled by bridge 4 (again using the look up table 5) before being communicated to SNA. Step 4 will determine whether the resynchronization is complete. Step 5 then determines if communications have been established and whether recovery is complete. If recovery has been completed the process ends at step 6. However, if at step 4 resynchronization is not complete then the process returns to step 3 and bridge 4 generates other messages required to complete the resynchronization protocol. Similarly, if at step 5 communication has not been reestablished the process returns to step 1 and recovery is again initiated by the application program.

Another feature of bridge 4 of the present invention, is the ability to bidirectionally convert transaction identifiers from the AIX or SNA network into the type of identifiers used within the other network, i.e. AIX transaction identifiers converted to SNA identifiers and SNA identifiers converted to AIX identifiers. It should be noted that the identifier conversion by bridge 4 and tables 10,12 is implemented using rules which dictate the semantics of how the identifiers are updated. A presume nothing protocol seeks to minimize the flow of state information, by bundling messages as previously discussed (see FIG. 8), whereas presumed abort protocol always transmits individual identifiers, i.e. unbundled information, and eliminates messages to update the identifiers. With a homogenous SNA network, using Syncpoint, each SNA participant is incremented, or updated at each transaction demarcation point, thus keeping all participants synchronized. A totally AIX network uses demarcation points, i.e. individual unbundled transaction state information to keep track of participant status. When AIX and SNA networks are combined through bridge 4, the SNA network 8 updates the state information, while the AIX system 2 must "map" the state information back to bridge 4 such that the AIX and SNA transaction processing systems are in synchronization.

Figure 6:
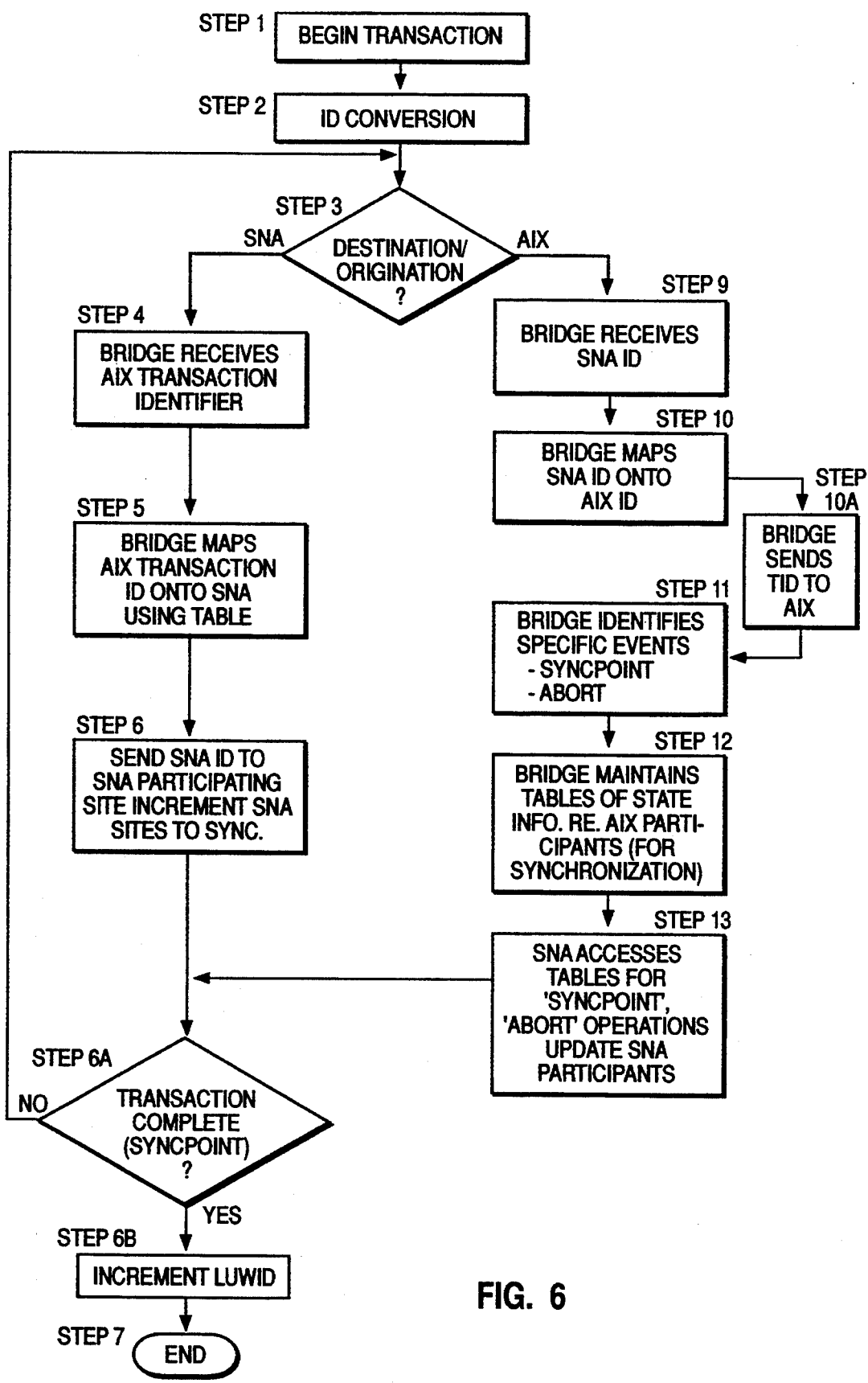
FIG. 6 is another flowchart showing the conversion between respective transaction identifiers utilized by the SNA and AIX distributed processing networks.

FIG. 6 represents the steps which must be implemented by the bridge 4 in order to accomplish conversion of transaction identifiers between the two interconnected distributed networks (see FIG. 8). At step 1 a program application begins a transaction which requires identification conversion (step 2). Step 3 determines whether the transaction coordinator is within the SNA or AIX network, i.e. whether the respective transaction origination and destination is from/to the AIX or SNA networks. If the message destination is an SNA network (AIX origination), bridge 4 receives the AIX transaction identifier from a participating AIX site 2 (step 4). Bridge 4 then maps the AIX transaction identifier to an identifier for use in the SNA system, at step 5, by using a transaction identifier (TID) look up table 10, and logical unit of work identifier (LUWID) look up table 12, for SNA IDs. The corresponding SNA identifier is then sent to the SNA transaction processing system 8 and ultimately to all transaction participating SNA sites (step 6). It should be noted that the AIX transaction processing system sends an AIX TID each time any data is transferred between sites. Conversely, the LUWID is only sent between SNA sites with the initial data transfer for a transaction. The SNA coordinator increments the LUWID at the conclusion of the transaction, e.g. Syncpoint (COMMIT, BACKOUT) Thus, it can be seen how the bridge 4 must track the AIX TIDs and increment the LUWID at the conclusion of a transaction in order for the AIX and SNA systems to remain synchronized, during transaction processing. The identifier conversion process then determines at step 6a if the transaction is complete and if so, the SNA LUWID is incremented (step 6b), indicating the next transaction is to be processed. If the transaction in not complete, the method returns to step 3.

If at step 3 it is determined that the transaction message origination is from the SNA network (destination is the AIX network), then the bridge 4 will receive a SNA identifier from the participating SNA transaction site (step 9). Bridge 4 then maps the SNA identifier onto an AIX transaction identifier by using look up tables 10,12, or the like (step 10). At step 10a, bridge 4 sends the TID, derived from mapping the LUWID, to participating AIX sites. At step 11, the bridge 4 identifies any specific SNA events such as Syncpoint (COMMIT, ABORT, BACKOUT). In order to accomplish the identification of specific events and synchronization between SNA and AIX participants at step 11, bridge 4 continues to maintain tables 10,12 which include state information regarding AIX participants (step 12). These tables 10,12 are accessible by a SNA participant during Syncpoint and ABORT operations such that the SNA participant can update the state information (step 13). Subsequent to step 13 the conversion process continues to step 6a and determines if the transaction is complete. If so, step 6b increments the LUWID and the process ends at step 7, or returns to step 3 for additional processing.

One of the constraints of transaction processing in the AIX 2PC/PA is that the site that initiates a transaction must conclude the transaction and becomes transaction coordinator. However, in the SNA transaction processing protocol the coordination responsibility can be assigned to any site, i.e. the transaction management responsibility can be transferred from one transaction coordinator to another transaction coordinator at a different site. Thus, it can be seen that this difference in protocol between the two transaction processing networks must be resolved by the bridge 4 such that an AIX transaction coordinator 40 can recognize and migrate transaction coordination responsibility to the SNA network (SNA transaction coordinator 30).

Figure 7A:
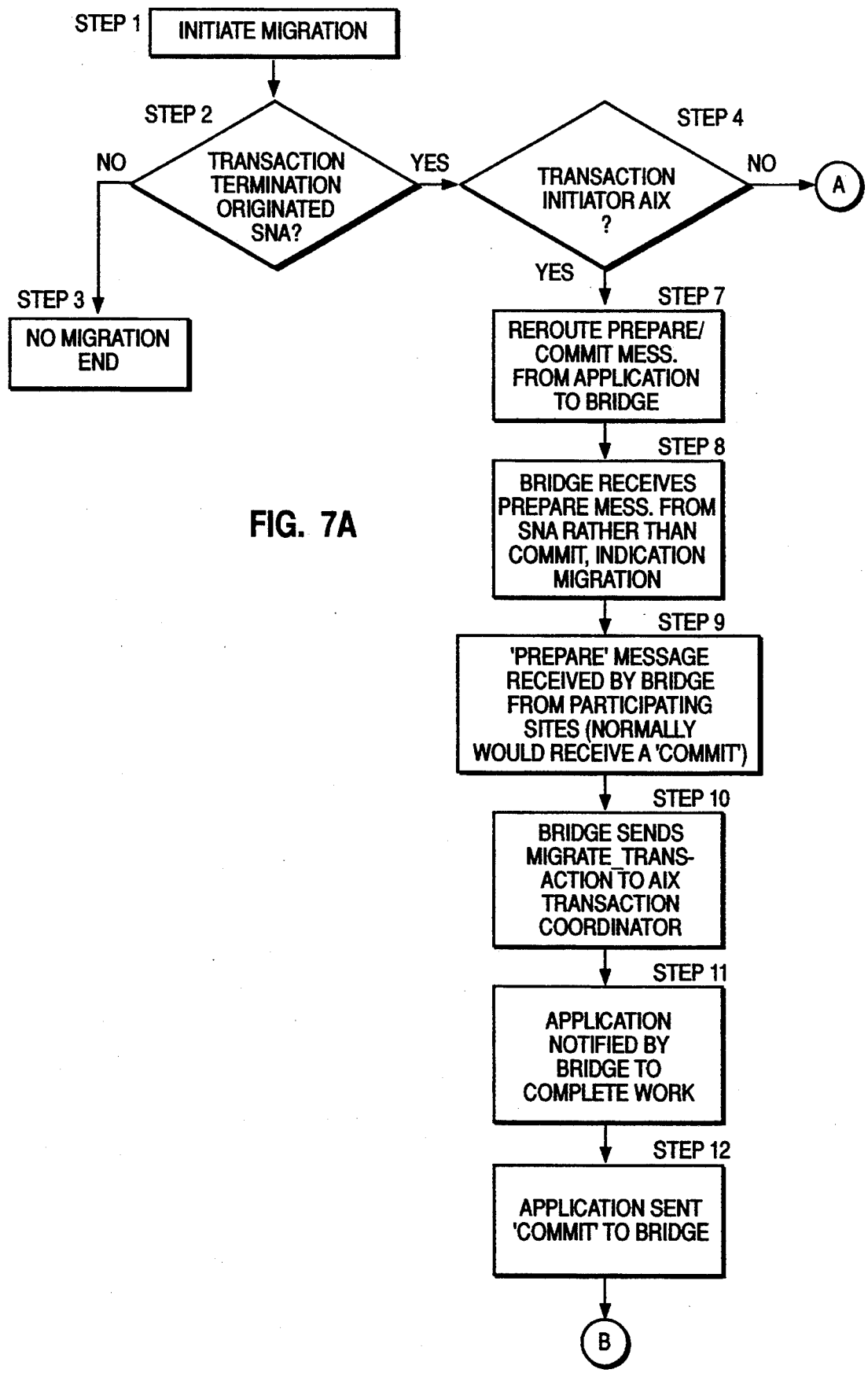
FIGS. 7A-7B are flowcharts representing the steps implemented by the present invention to enable the AIX and SNA networks to provide the transaction migration service required by SNA systems.
Figure 7B:
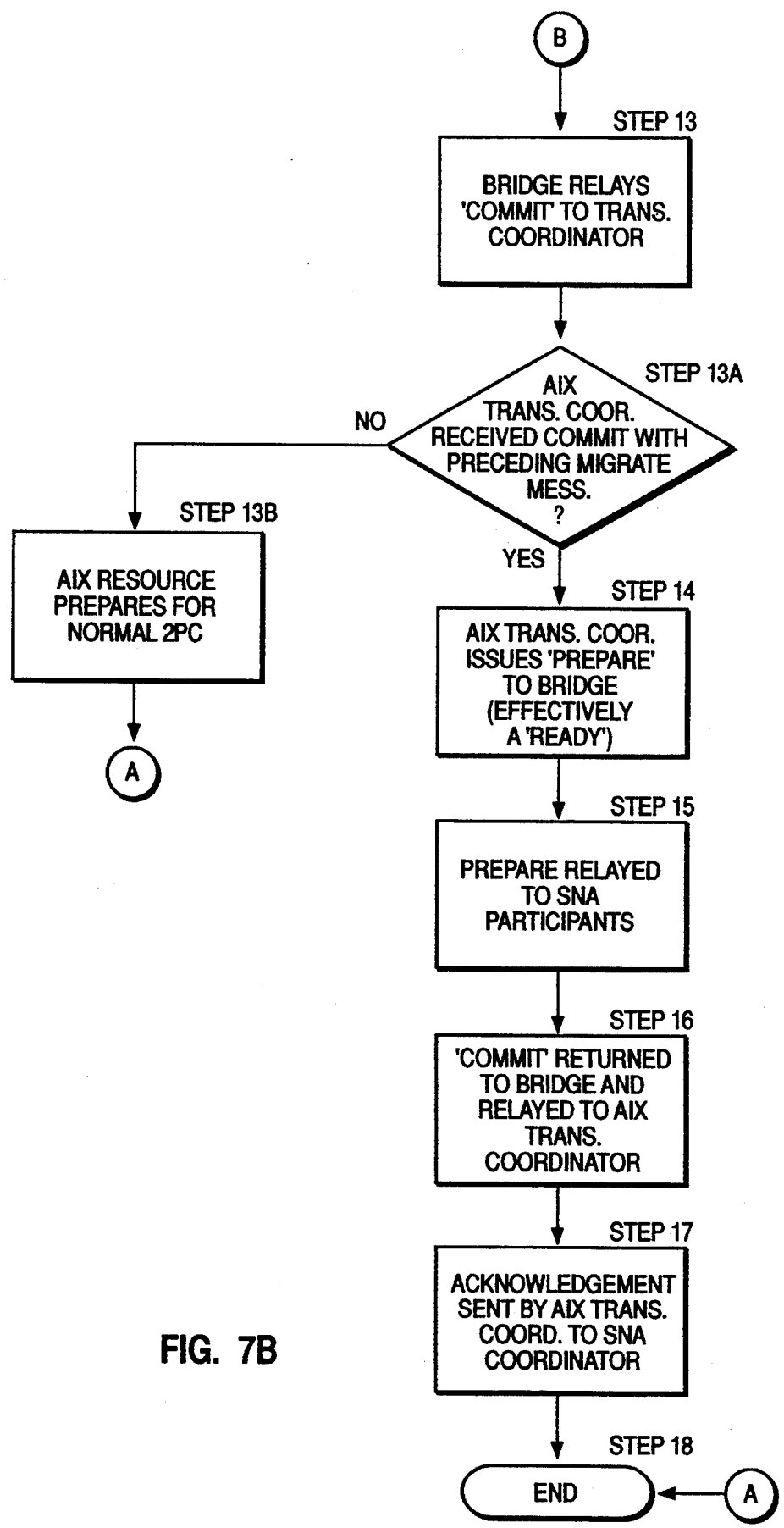

FIGS. 7A–7B represent the processes which must be implemented by bridge 4 in order to maintain transparency between an AIX and SNA distributed processing network, regarding the assignment of the transaction coordination (migration) aspect contained in the SNA protocol. Thus, the present invention allows migration of transaction coordination transparently between the AIX and the SNA networks. At step 1, migration of a transaction is initiated and step 2 the bridge 4 determines whether the transaction termination was originated in the SNA network. If the termination originated in the AIX network then it can be seen that no migration commands will be implemented, since transaction migration is not provided in AIX. and the process ends at step 3.

If, at steps 2 and 4 it was determined by the bridge 4 that transaction termination originated from SNA and the transaction initiator originated from AIX then bridge 4 must resolve any protocol conversion problems which may arise when the transaction coordination responsibility is migrated. If at step 4 the transaction initiator is in the SNA network, then no protocol discrepancy exists. In an SNA only network there is an expectation of migration, while in an AIX network no provision for migration exists. Therefore, these conflicts will only arise when an SNA transaction system requests transaction coordination responsibility, and an AIX site has initiated the transaction. Assuming this is the case, special handling is required by rerouting the PREPARE/COMMIT messages from the program application to the bridge, for interpretation prior to relay to the transaction manager (step 7).

To implement migration between AIX and SNA sites a preliminary stage is added to the 2PC/PN protocol to inform the transaction manager that another site wishes to assume coordination responsibility. Previous to step 8, the SNA coordinator has received a PREPARE message from the SNA participants which is then sent to, and received by bridge 4 (step 8). Since a PREPARE message has been received from the network by bridge 4, rather than a COMMIT message from the application (which is the usual case) the previously noted preliminary stage is implemented and bridge 4 then issues a MIGRATE_TRANSACTION message (command) to the AIX transaction coordinator 40 (step 10). MIGRATE_TRANSACTION is a new command, to accommodate this SNA feature, thus a facility is provided by the present invention which allows recognition of migration of a transaction from the AIX system. The bridge 4, at step 11, then informs/notifies the application at the transaction origination node to complete all pending, or deferred work. The application, at step 12, eventually issues a COMMIT request to the bridge, at the completion of the work. It should be noted that the present invention is enabled by sending COMMIT to bridge 4 which thereby allows bridge 4 to migrate coordination responsibility (i.e. COMMIT and TRANSACTION_MIGRATION). The COMMIT message from the application is then relayed to the AIX transaction manager (i.e. transaction manager of AIX resources only) at step 13. Next, it is determined if the AIX transaction manager has received this COMMIT with the MIGRATE message immediately preceding thereto (step 13a). If there has not been a MIGRATE message preceding the COMMIT, then the AIX transaction manager prepares for normal Two-Phase Commit/Presumed Abort protocol (step 13b) afterwhich the process continues to step 18 and ends. However, if the AIX transaction manager did receive a MIGRATE command preceding a COMMIT message, then a request has been made from the SNA system that coordination responsibility of the entire transaction be migrated. Thus it can be seen that a COMMIT_TRANSACTION not preceded by MIGRATE_TRANSACTION does not allow coordination migration to occur. At this point it should be noted that the original SNA transaction coordinator is receiving messages which make it react in the same manner as any other SNA participating resource site. Thus, transaction responsibility is considered to have "migrated." At step 14, the AIX transaction coordinator issues a PREPARE message to the bridge. This PREPARE message is effectively the same as a READY which is then relayed to the SNA participant sites, including the former SNA transaction coordinator which is now acting as any other participant (step 15). At step 16, a COMMIT message is sent to the bridge 4, from the SNA transaction coordinator which then relays this response to the AIX transaction coordinator. At step 17 the AIX coordinator then sends an ACKNOWLEDGE message to the bridge which is relayed on to the SNA coordinator and the migrated transaction ends at step 18.

Thus, it can be seen how the present invention allows an AIX transaction coordinator to be used for coordinating the 2PC protocol when the SNA distributed transaction processing system implements a MIGRATE_TRANSACTION operation.

Although certain preferred embodiments have been shown and described, it should be understood that many changes and modifications may be made therein without departing from the scope of the appended claims. For example, the 2PC/PN and 2PC/PA protocols have been used for exemplary purposes only, and protocol conversions between 2PC/PA, 2PC/PN, 3PC (three phase commit), or any other commit transaction protocol are contemplated by the present invention.

What is claimed is:

1. A method wherein a protocol conversion bridge, in a computer operating system, enables a transaction to be processed across first and second interconnected distributed networks, each network having unique transaction processing protocols, said method comprising the computer implemented steps of:

converting a first set of rules that define a first transaction processing protocol for said first network into a second set of rules that define a second transaction processing protocol for said second network;

converting first transaction processing information, based upon said first protocol into second transaction processing information, based upon said second protocol, in accordance with said second set of rules;

causing migration of transaction coordination responsibility from said first network to said second network based upon a migrate transaction coordination request, included in said second transaction processing protocol, transmitted from said second network to said first network;

synchronizing said first and second networks, subsequent to a communications failure therebetween, to generate consistent first transaction state information and second transaction state information between said first and second networks, respectively; and exchanging, by said conversion bridge, said state information relating to said first transaction processing information and said second transaction processing information, for the transaction being processed across said first and second networks, to recover said first and second transaction processing information.

2. A method according to claim 1 further comprising the step of migrating coordination responsibility for said transaction between said first and second networks, such that the transaction can be processed according to either said first or second protocol.

3. A method according to claim 2 wherein said step of converting a set of rules comprises:

generating messages required by said first or second distributed network to complete a commit phase of processing said transaction; and ignoring messages generated by said first or second network, which are not required by the respective other distributed network to complete the commit phase of processing said transaction.

4. A method according to claim 3 wherein said step of converting first transaction processing information comprises:

converting first transaction processing state information, associated with said first protocol, into second transaction processing state information, associated with said second protocol; and converting a first transaction identifier corresponding to said first transaction state information into a second transaction identifier corresponding to said second transaction processing state information.

5. A method according to claim 4 wherein said step of exchanging status information comprises:

comparing said first transaction processing state information with said second transaction processing state information; and exchanging said first and second transaction processing state information between said first and second distributed networks.

6. A method according to claim 5 wherein said step of exchanging said first and second transaction processing state information further comprises:

combining said first or second transaction processing state information into a high level flow of transaction processing state information, capable of being received by the respective one of said first or second distributed networks; and separating said first or second transaction processing state information into discrete transaction processing state information capable of being received by the respective one of said first or second distributed networks.

7. A method according to claim 6 wherein said step of converting a first transaction identifier comprises:

mapping the first transaction identifier into the second transaction identifier, by accessing at least one look up table; and tracking the first transaction identifier from said first distributed network such that synchronization between said first and second distributed networks is maintained.

8. A method according to claim 7 wherein said step of tracking comprises:

incrementing the second transaction identifier at the conclusion of processing of the transaction; and updating state information maintained within said at least one look up table at the conclusion of processing of the transaction.

9. A method according to claim 8 wherein said step of migrating coordination responsibility comprises recognizing a command, by said first or second distributed network, requiring migration of transaction coordination.

10. A method according to claim 9 wherein said step of recognizing comprises the step of receiving said migration command immediately prior to receiving a command to commit the transaction.

11. A protocol conversion bridge in a computer operating system that enables a transaction to be processed across first and second interconnected distributed networks, each network having unique transaction processing protocols, said bridge comprising:

means for converting a first set of rules that define a first transaction processing protocol for said first network into a second set of rules that define a second transaction processing protocol for said second network;

means for converting first transaction processing information, based upon said first protocol into second transaction processing information, based upon said second protocol, in accordance with said second set of rules;

means, within said protocol conversion bridge, for causing migration of transaction coordination responsibility from said first network to said second network based upon a migrate transaction coordination request, included in said second transaction processing protocol, transmitted from said second network to said first network;

means for synchronizing said first and second networks, subsequent to a communications failure therebetween, to generate consistent first transaction state information and second transaction state information between said first and second networks, respectively; and means, in said bridge, for exchanging said state information relating to said first transaction processing information and said second transaction processing information, for the transaction being processed across said first and second networks, to recover said first and second transaction processing information.

12. A system according to claim 11 further comprising means for migrating coordination responsibility for said transaction between said first and second networks, such that the transaction can be processed according to either said first or second protocol.

13. A system according to claim 12 wherein said means for converting a set of rules comprises:

means for generating messages required by said first or second distributed network to complete a commit phase of processing said transaction; and means for ignoring messages generated by said first or second network, which are not required by the respective other distributed network to complete the commit phase of processing said transaction.

14. A system according to claim 13 wherein said means for converting first transaction processing information comprises:

means for converting first transaction processing state information, associated with said first protocol, into second transaction processing state information, associated with said second protocol; and means for converting a first transaction identifier corresponding to said first transaction state information into a second transaction identifier corresponding to said second transaction processing state information.

15. A system according to claim 14 wherein said means for exchanging status information comprises:

means for comparing said first transaction processing state information with said second transaction processing state information; and means for exchanging said first and second transaction processing state information between said first and second distributed networks.

16. A system according to claim 15 wherein said means for exchanging said first and second transaction processing state information further comprises:

means for combining said first or second transaction processing state information into a high level flow of transaction processing state information, capable of being received by the respective one of said first or second distributed networks; and means for separating said first or second transaction processing state information into discrete transaction processing state information capable of being received by the respective one of said first or second distributed networks.

17. A system according to claim 16 wherein said means for converting a first transaction identifier comprises:

means for mapping the first transaction identifier into the second transaction identifier, by accessing at least one look up table; and means for tracking the first transaction identifier from said first distributed network such that synchronization between said first and second distributed networks is maintained.

18. A system according to claim 17 wherein said means for tracking comprises:

means for incrementing the second transaction identifier at the conclusion of processing of the transaction; and means for updating state information maintained within said at least one look up table at the conclusion of processing of the transaction.

19. A system according to claim 18 wherein said means for migrating coordination responsibility comprises means for recognizing a command, by said first or second distributed network, requiring migration of transaction coordinations.

20. A system according to claim 19 wherein said means for recognizing comprises means for receiving said migration command immediately prior to receiving a command to commit the transaction.

* * * * *